United States Patent [19]

Williams, Jr.

[11] 4,404,560

[45] Sep. 13, 1983

[54] CAPACITIVE TRANSDUCER FOR PROVIDING PRECISE ANGULAR POSITIONAL INFORMATION

[75] Inventor: Errol R. Williams, Jr., Round Rock, Tex.

[73] Assignee: International Business Machines Corporation, Armonk, N.Y.

[21] Appl. No.: 261,401

[22] Filed: May 7, 1981

[51] Int. Cl.³ .............................................. G08C 19/16
[52] U.S. Cl. .............................. 340/870.37; 324/60 C; 340/686; 340/688
[58] Field of Search ................... 340/870.37, 688, 686; 324/60 C

[56] References Cited

U.S. PATENT DOCUMENTS

| | | | |
|---|---|---|---|
| 3,068,457 | 12/1962 | Nevills | 340/870.37 |
| 3,348,133 | 10/1967 | Wolfendale | 340/870.37 |
| 3,702,467 | 11/1972 | Melnyk | 340/870.37 |
| 3,938,113 | 2/1976 | Dobson et al. | 340/870.37 |
| 4,040,041 | 8/1977 | Fletcher et al. | 340/870.37 |

OTHER PUBLICATIONS

"Dual Plane Capacitive Coupling Encoder" authored by R. J Flaherty, M. L. Sendelweck, and J. W. Woods, *IBM Technical Disclosure Bulletin*, vol. 15, No. 4, Sep. 1972.
"Electrodynamic Velocity and Position Sensor and Emitter Wheel", authored by H. E. Naylor, III and R. A. Williams, *IBM Technical Disclosure Bulletin*, vol. 16, No. 10, Mar. 1974.
"Trapped Charge Transducer for Low-Cost Angular Position Sensing", authored by J. M. Rakes, and E. R. Williams, *IBM Technical Disclosure Bulletin*, vol. 23, No. 11, Apr. 1981.

*Primary Examiner*—Glen R. Swann, III
*Attorney, Agent, or Firm*—J. B. Kraft

[57] ABSTRACT

A transducer is described which has a rotor with at least one track of spaced conductive segments and a stator having at least one track of spaced conductive segments respectively facing and spaced from the track on the stator. Apparatus for rotating the rotor with respect to the stator is included whereby the track on the rotor rotates with respect to the track on the stator. An electrical signal source provides an alternate electrical signal to the track of conductive segments on either the rotor or the stator, and means are connected to the other track of conductive segments for sensing the capacitive effect in said other track by said electrical signal. At least one of the tracks has a plurality of non-rectangular segments, e.g., triangular segments of shapes selected to produce transducer output waveforms of varied shapes.

6 Claims, 6 Drawing Figures

CAPACITIVE TRANSDUCER FOR PROVIDING PRECISE ANGULAR POSITIONAL INFORMATION

DESCRIPTION

1. Technical Field

This invention relates to angular position sensing transducers and more particularly to capacitive position sensing transducers.

2. Background Art

Angular shaft position sensing devices have been extensively used for many years. Traditionally, such position sensing transducers have been either magnetic sensing transducers or optical sensing transducers. However, in the past decade, capacitive position sensing transducers have been increasing in interest to the art. Capacitive transducers have been less sensitive to stray noise than either magnetic or optical transducers. Unlike the optical transducer, the capacitive transducers are not sensitive to ambient light and unlike the magnetic transducer, the capacitive transducer is not sensitive to stray magnetic fields. In addition, the capacitive transducer is less sensitive to the effects of accumulated dust than the other transducers. Capacitive transducers are lower in cost than optical transducers.

Some representative prior art description of capacitive transducer technology may be found in the following:

"Dual Plane Capacitive Coupling Encoder" authored by R. J. Flaherty, M. L. Sendelweck, and J. W. Woods, *IBM Technical Disclosure Bulletin*, Vol. 15, Nov. 4, September 1972.

"Electrodynamic Velocity and Position Sensor and Emitter Wheel", authored by H. E. Naylor, III, and R. A. Williams, *IBM Technical Disclosure Bulletin*, Vol. 16, No. 10, March 1974.

"Trapped Charge Transducer for Low-Cost Angular Position Sensing", authored by J. M. Rakes and E. R. Williams, *IBM Technical Disclosure Bulletin*, Vol. 23, No. 11, April 1981.

U.S. Pat. No. 3,702,467, "Shaft Position Sensing Device", George Melnyk, Issued Nov. 7, 1972.

U.S. Pat. No. 3,938,113, "Differential Capacitive Position Encoder", D. R. Dobson et al, Issued Feb. 10, 1976.

U.S. Pat. No. 4,040,041, "Twin-Capacitive Shaft Angle Encoder with Analog Output Signal", J. C. Fletcher et at, Issued Aug. 2, 1977.

In conventional capacitive transducers of the group illustrated above, a plurality of conductive segments in a movable element, i.e., the rotor coact with a plurality of conductive segments on a stationary element, i.e., the stator spaced from the movable element to produce the output pulses indicative of the velocity and the position of the movable element. In standard capacitive transducer technology, the repetitive patterns of conductive elements both on the stator and rotor have been substantially rectangular in shape. This has produced sensed output pulses which are also substantially rectangular. With such rectangular, e.g., square wave pulses, the preciseness of the angular position being sensed is limited since all position along a particular elevated segment or depressed segment in the square or rectangular wave will produce the same signal.

The description of the conductive segments on the rotor and/or stator as substantially rectangular is meant to include patterns in which each of the segments has two sides formed along radii through the axis of rotation of the rotor. Patterns of such conductive segments, a wide variety of which are set forth in U.S. Pat. No. 3,222,668, "Capacitive Coder", B. Lippel, issued Dec. 7, 1965, will produce a substantially rectangular or square waveform, i.e., produce waveforms which have two clearly distinct states. Thus, they are in effect digital signals.

The present invention provides an expedient wherein pulses produced can be tailored into virtually any predetermined shape by varying the shape of the repetitive segment on either the stator or rotor in preselected non-rectangular patterns. The resulting signal will have a waveform of varying shape. It will be essentially analog in characteristics.

SUMMARY OF THE INVENTION

The present invention provides a capacitive transducer wherein angular positions and consequently angular velocities may be more precisely sensed through the production of transducer output signal patterns which are non-rectangular in shape. The capacitive transducer comprises a first member having a first track of spaced repetitive conductive segments and a second member having a second track of spaced repetitive conductive segments spaced from and facing the first track. Means are provided for moving one of said members with respect to the other whereby the track on the moving member rotates with respect to the track on the other member. Means are provided for applying an alternating electric signal to the first of said tracks of repetitive conductive segments and means connected to the second track of repetitive conductive segments for sensing the electrical signal induced in the second track by said capacitive effect. At least one of the tracks has repetitive segments having shapes other than rectangular shapes; this will result in a transducer output waveform of a non-rectangular shape. By tailoring the shape of the non-rectangular segments, a wide variety of transducer output waveform shapes may be produced. Thus, the transducer has the capability of producing a continuously varying waveform, (i.e., analog waveform as opposed to the more conventional prior art waveform) which was a square or rectangular (i.e., digital waveform). With the continuously varying waveform produced by the transducer of the present invention, it becomes possible to more precisely find angular position of a rotating shaft at any specific point in time.

Preferably, the first and second members are embodied by the conventional capacitive transducer rotor and stator members. The non-rectangular segments may desirably be triangular in shape or even combine to form a sinusoidal pattern.

Accordingly, the transducer of the present invention produces output patterns which are continuously varying as opposed to more conventional transducers which produce square or rectangular wave patterns wherein all of the positions along a particular elevated wave segment or depressed wave segments will provide the same signal level. With a continuously varying signal produced by the transducer of the present invention, it is possible to more precisely define angular positions since every position along the wave produces a signal level different from its adjacent positions.

BRIEF DESCRIPTION OF THE DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
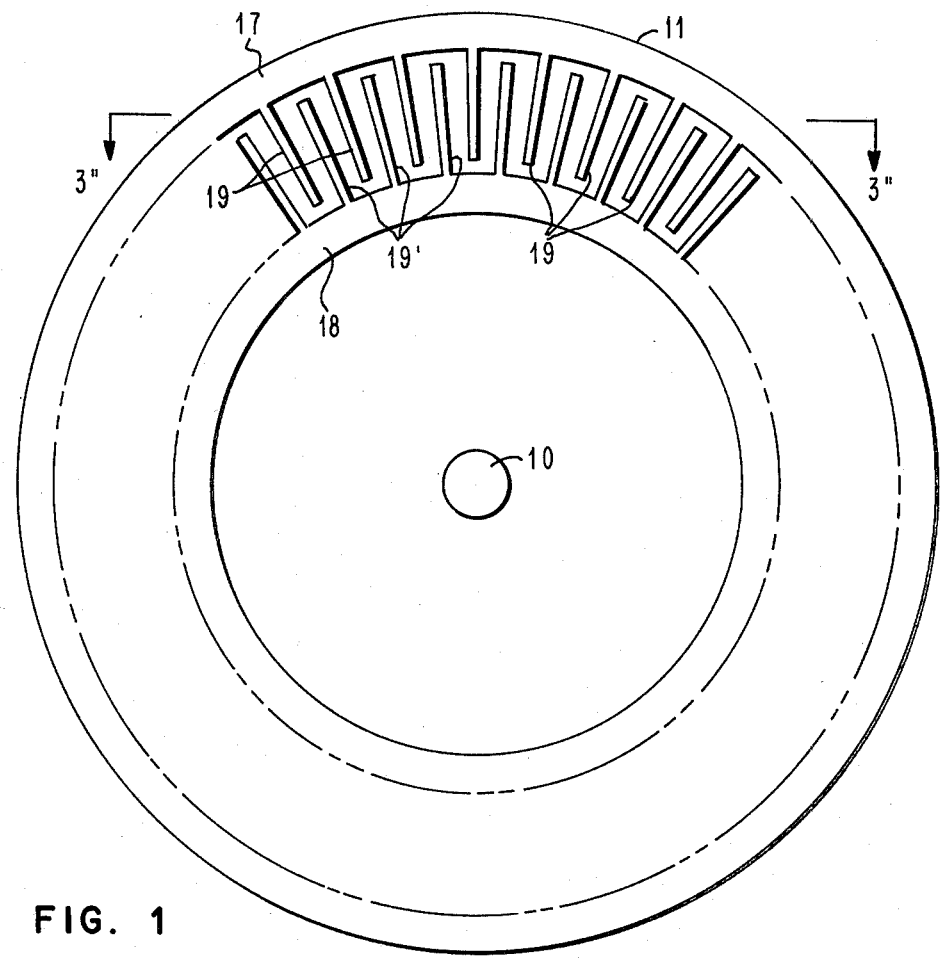
FIG. 1 is a diagrammatic plan view of the planar surface on the rotor which forms a portion of the transducer of the present invention.
Figure 3:
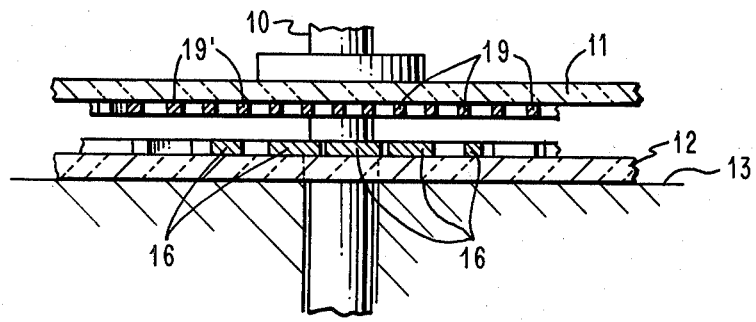
FIG. 3 is an enlarged fragmentary sectional side view showing the rotor and stator of FIGS. 1 and 2 mounted on a shaft to illustrate relative positions of the conductive segments in the rotor and stator.
Figure 2:
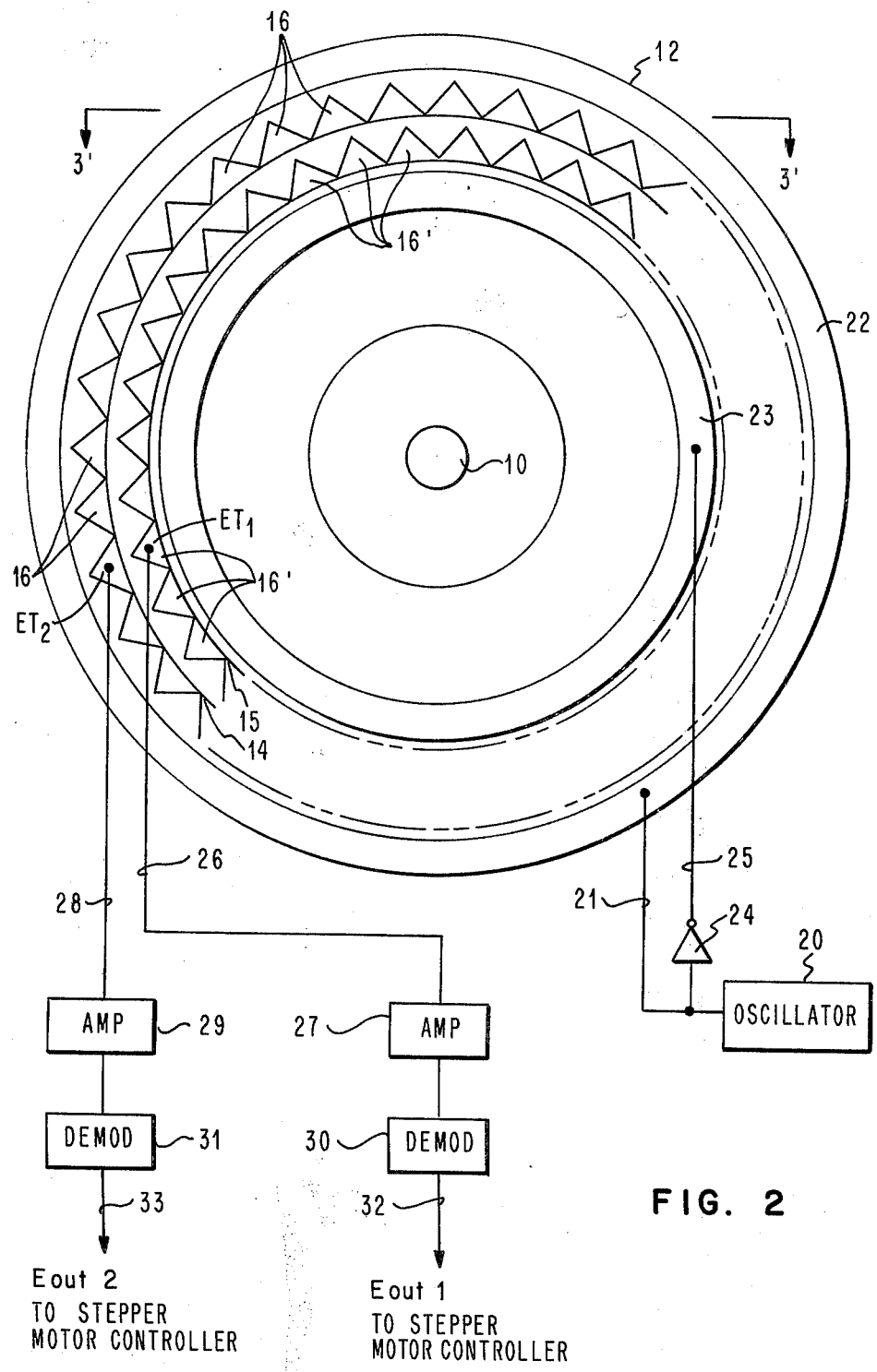
FIG. 2 is a diagrammatic plan view of the stator surface containing two tracks of conductive non-rectangular segments forming another portion of the transducer together with a circuit logic drawing of the circuitry necessary to provide the alternating signal and to monitor the induced capacitive effect.

With reference to FIGS. 1, 2 and 3, in the preferred embodiment of the present invention, rotatable shaft 10 which has rotor 11 mounted thereon so that shaft 10 of rotor 11 rotates with respect to stator 12 which is affixed to frame 13 of the equipment. Stator 12 contains two tracks 14 and 15 of electrically conductive segments 16 and 16'. The segments in each of the tracks are connected to each other. The rotor 11 contains two concentric annular conductive plates 17 and 18. A radial array of fingers 19 extend from conductive plate 17 and a second radial array of conductive fingers 19' extend from conductive plate 18.

As will be described hereinafter in greater detail, the purpose of using two tracks 14 and 15 of conductive segments is to produce two different signals which may be used for two different phases of the stepper motor drive. Any number of tracks could be used, e.g., for a three phase stepper motor drive, three tracks could be used.

Considering now the operation of the transducer of the present invention, oscillator 20 produces an alternating output on line 21 which is applied to annular conductive plate 22 on the stator. In addition, inverter 24 inverts the alternating output from oscillator 20 on line 21, i.e., brings it 180° out of phase and applies that output via line 25 to annular conductive plate 23. The alternating signals on lines 21 and 25, respectively designated Ein1 and Ein2, are shown in the timing chart in FIG. 4. It should be noted that the oscillator output on line 21 (Ein1) is to be applied to fingers 19 of the rotor while the inverted oscillator output (Ein2) on line 25 is to be applied to fingers 19' on the rotor. Since it is conventional practice not to couple any lines directly to the rotor on the rotating shaft, respective oscillator outputs described are applied to fingers 19 and 19' through capacitive coupling respectively provided by annular plate 22 on the stator which is capacitively coupled to annular plate 17 on the rotor and annular plate 23 on the stator which is capacitively coupled to annular plate 18 on the rotor. The areas of these two pairs of capacitively coupled plates is so substantial in relation to the spacing between the coupled plates that the amplitude of the oscillator output being respectively applied to fingers 19 and 19' is only minimally diminished.

Figure 4:
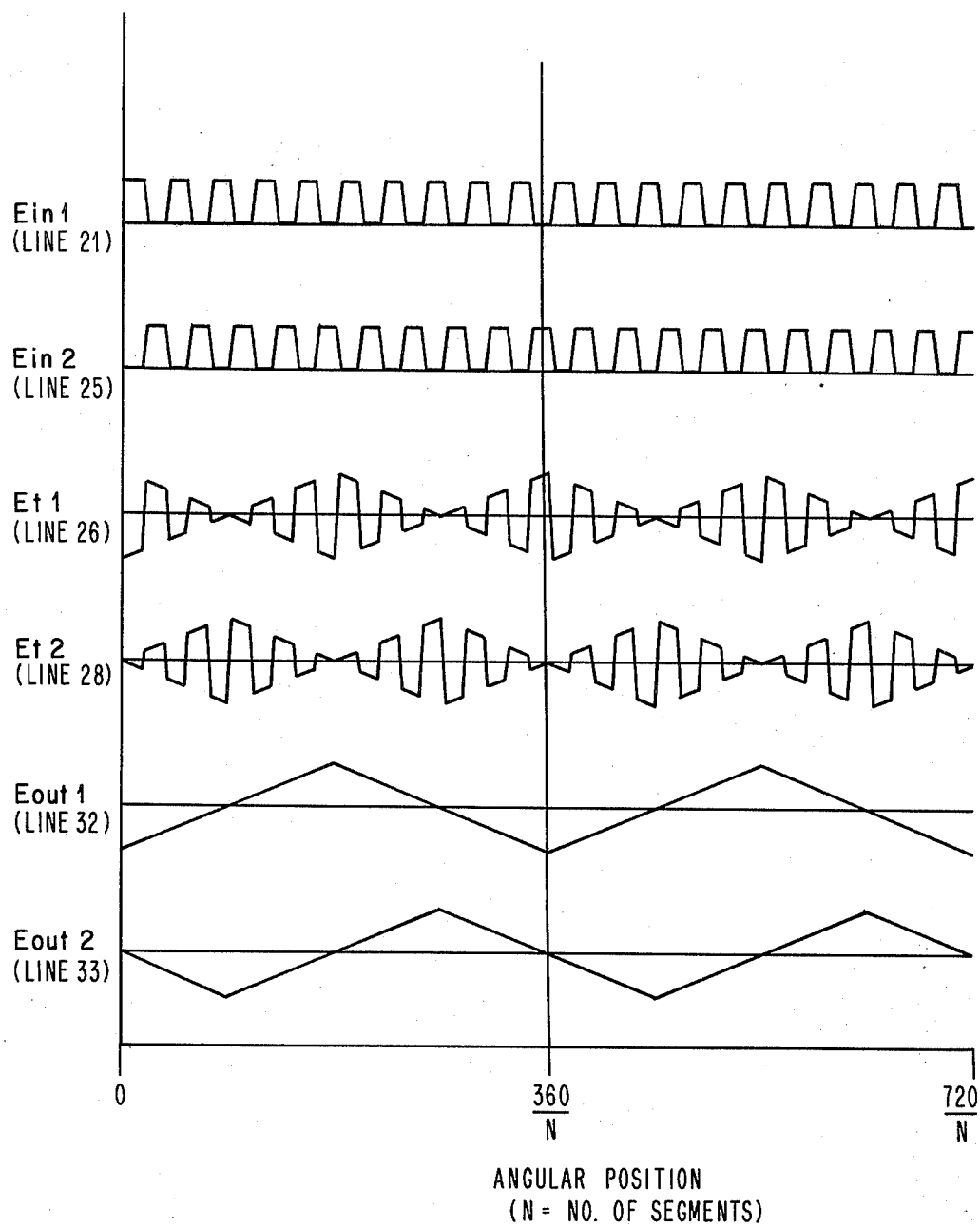
FIG. 4 is a timing chart showing the electrical output of the circuit logic elements in FIG. 2 relative to the rotational shaft position.

Finger array 19 is capacitively coupled to the conductive segments 16 and 16' in both tracks 14 and 15. Also, finger array 19' in the rotor is capacitively coupled to conductive segments 16 and 16' in both tracks 14 and 15. Conductive segments 16' in track 15 are arranged so that they are spacially 90° out of phase with conductive segments 16 in track 14. The output from track 15, designated Et1, is applied on line 26 to amplifier 27 while the output of track 14, designated Et2, is applied via line 28 to amplifier 29. Et1 and Et2 have the waveforms shown in FIG. 4. The outputs of amplifiers 27 and 29 are respectively applied to demodulators 30 and 31. The outputs of demodulators 30 and 31 on lines 32 and 33, respectively designated Eout1 and Eout2 shown in FIG. 4, may then be applied to a stepper motor drive or control system and used to control the two phases of a stepper motor. As indicated by FIG. 4, the waveforms Eout1 and Eout2 are in effect respectively the demodulated envelopes of the amplified waveforms Et1 and Et2 which are applied to amplifiers 27 and 29. Since segments in tracks 14 and 15 were 90° out of phase, waveforms Eout1 and Eout2 are also 90° out of phase with each other.

Some typical operational parameters which may be used in connection with structure and circuitry described above are rotor rotating at about 20 rps, and oscillator 20 output having a voltage swing of 12 volts at a frequency of 1 MHz and an amplifier which provides an amplified output yielding a demodulated envelope having a voltage swing of 2 volts. The air gap between the stator and rotor is in the order of from 0.005 to 0.05 inches.

In order to promote a better understanding of the principles involved in the present invention, the following theory is offered as to how waveform Et1 on line 26 shown in FIG. 4 results. Of course, the theory will be equally applicable to waveform Et2 on line 28.

The annular portion of stator plate 23 and rotor plate 18 of FIG 1 have identical circular shapes and dimensions. A relatively large and constant capacitance exists between them as the rotor turns with respect to the stator. Similarly, a relatively large and constant capacitance exists between plates 17 and 22. The high frequency modulating signals, Ein1 and Ein2, are applied to plates 22 and 23, respectively, and because of the large and unvarying capacitive couplings, the Ein1 and Ein2 waveforms appear to rotor plates 17 and 18, respectively.

As shown in FIG. 4, Ein1 and Ein2 are identical but opposite in phase. As rotor fingers 19 and 19' move over segments 16', the voltage Et1 induced on track 15 can be shown to be $$Et1 = Ein1(C1 - C2)/(C1 + C2)$$

where C1 is the varying capacitance between segment array 19 and track 15, and C2 is the varying capacitance between segment array 19' and track 15. Since capacitances C1 and C2 vary directly with the area of track 15 immediately under fingers 19 and 19', respectively, the induced waveform Et1 is determined by the shape of segments 16'.

The rotor and stator patterns and circuitry described above provide an invention which is based upon the tailoring of the conductive segments in the stator in a non-rectangular form. By thus tailoring stator tracks, it is possible to produce a waveform configuration from the transducer which has any desired form, e.g., it may be triangular or even sinusoidal. With such a capability, the waveform from the transducer yields more precise positional and consequently velocity data.

Figure 6:
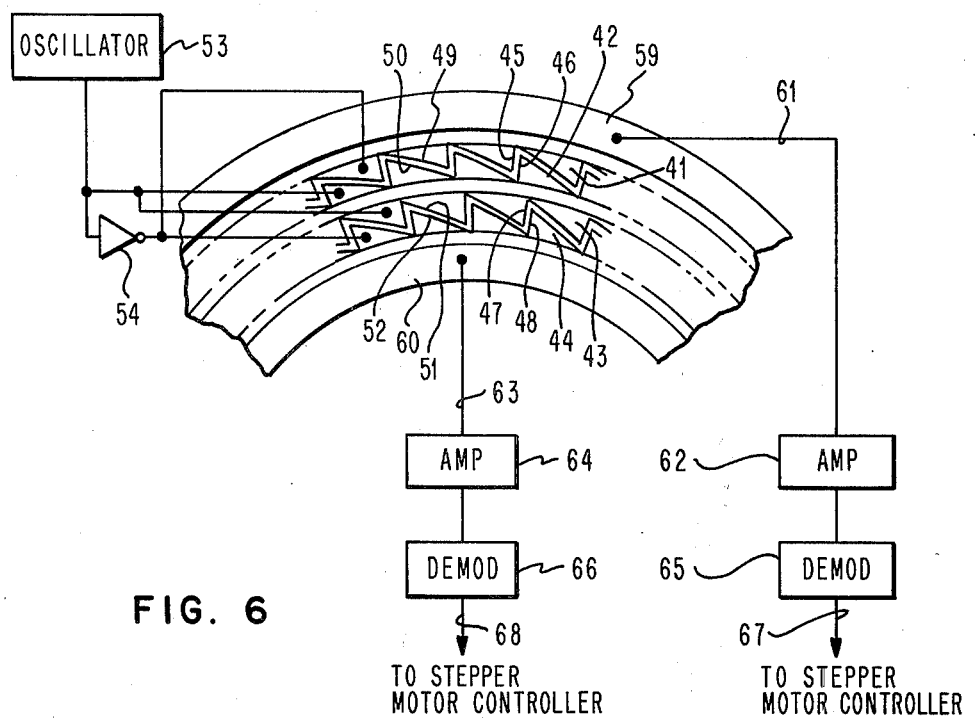
FIG. 6 is a diagrammatic plan view of a portion of the stator surface which together with the rotor shown in FIG. 5 forms a transducer.
Figure 5:
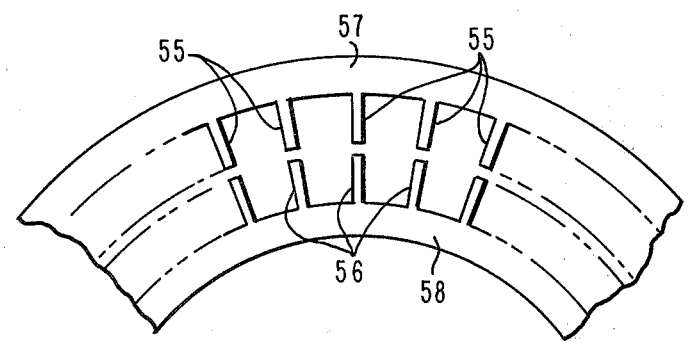
FIG. 5 is a diagrammatic plan view of a portion of the planar surface on the rotor in accordance with another aspect of the present invention.

The rotor and stator pattens shown in FIGS. 1 and 2 produce waveforms that are independent of the direction of rotor rotation. These waveforms are adequate for some types of stepper motor controllers. If waveforms are desired which are different depending on the direction of rotation and which allow more precise bidirectional control, then a somewhat more sophisticated stator pattern as shown in FIG. 6 should be used. The rotor associated with the stator in FIG. 6 has the conductive pattern shown in FIG. 5. Without going into the operation, the patterns and circuitry for transducer having the rotor and stator patterns respectively shown in FIGS. 5 and 6 will now be described. It will be obvious to one skilled in the art in light of the operations described above how such a transducer can be used to provide two phase output to stepper motor control circuitry when the shaft is respectively rotating in both the clockwise and counterclockwise directions. There are four tracks 41, 42, 43 and 44 of conductive segments on the stator. The segments in each of the track each have one edge, i.e., edges 45, 46, 47 and 48, respectively, radial to the axis of rotation of the rotor and another edge, edges 49, 50, 51 and 52, respectively, which is non-radial. The output of oscillator 53 is applied directly to conductive segments in tracks 42 and 43. In addition, the output of oscillator 53 is inverted in inverter 54 and applied to conductive segments in tracks 41 and 44. In the rotor, conductive fingers 55 which extends from annular plate 57 rotate across tracks 41 and 42 in the stator while conductive fingers 56 extend from annular plate 58 rotate across tracks 43 and 44 in the stator. The output from fingers 55 is applied via annular plate 57 which is capacitively coupled to annular plate 59 in the stator through line 61 to amplifier 62 while the output sensed by fingers 56 in the rotor are applied via annular plate 58 which is capacitively coupled to annular plate 60 in the stator through line 63 to amplifier 64. These outputs are consequently amplified and respectively demodulated through demodulators 65 and 66 as previously described with respect to FIG. 2 to produce a two phase output along lines 67 and 68 which may be used to more precisely control stepper motors irrespective of the rotational direction of the rotor.

While the invention has been particularly shown and described with reference to a preferred embodiment it will be understood by those skilled in the art that various other changes in form and detail may be made without departing from the spirit and scope of the invention.

I claim:

1. A capacitive transducer comprising:
   a first member having a first track of a plurality of sequential conductive segments of the same shape and size,
   a second member having a second track of a plurality of sequential conductive segments spaced from and facing said first track,
   means for rotating one of said members with respect to the other whereby the track on said rotating member rotates with respect to the track of the other member,
   means for applying an alternating electrical signal to the first of said tracks of conductive segments, and
   means connected to the second track of conductive segments for sensing the capacitive effect induced in said second track of conductive segments by said electrical signal,
   at least one of said tracks having a plurality of triangular shaped segments each having one side radial to the axis of rotation of said moving member.

2. The capacitive transducer of claim 1 wherein said first and second tracks of spaced conductive segments are respectively arranged in circular lines concentric with said axis of rotation.

3. The capacitive transducer of claim 2 wherein said plurality of triangular shaped segments are contiguous and form a pattern having a sinusoidal form.

4. The capacitive transducer of claim 2 wherein said other member is stationary and said track having a plurality of triangular shaped segments is on said stationary member.

5. The capacitive transducer of claim 4 wherein said stationary member has at least two spaced concentric tracks of triangular shaped conductive segments and said rotating member has at least two tracks of conductive segments spaced from and respectively facing said two tracks on said stationary member.

6. The capacitive transducer of claim 5 wherein said means for applying an alternating electrical signal are adapted to apply a first alternating electrical signal to one of said stationary member tracks and a second alternating electrical signal out of phase with said first alternating electrical signal to the other of said stationary member tracks.

* * * * *